United States Patent Office 2,972,004
Patented Feb. 14, 1961

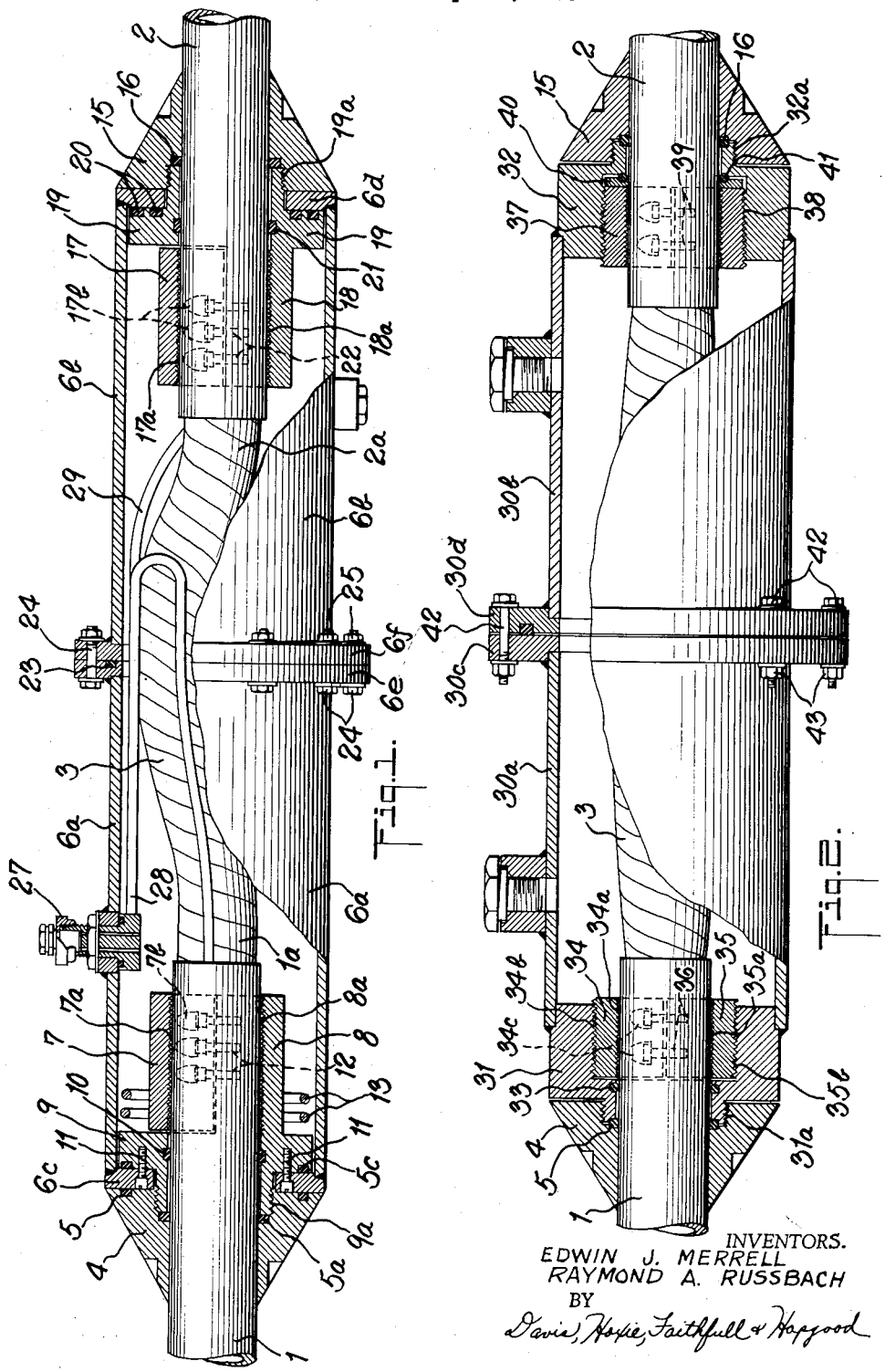

2,972,004
CABLE JOINT CASING

Edwin J. Merrell, Scarsdale, and Raymond A. Russbach, Yonkers, N.Y., assignors to Phelps Dodge Copper Products Corporation, New York, N.Y., a corporation of Delaware Filed Sept. 4, 1958, Ser. No. 759,035

8 Claims. (Cl. 174—91)

This invention relates to protective casings for the joints between lengths of electric cables of the type having a hard metallic external sheath surrounding the insulated conductor or conductors of the cable. The invention has particular reference to an improved cable joint casing which may be applied quickly and easily in the field and yet is of relatively simple and inexpensive construction.

The joints of lead sheathed cables are usually protected mechanically by a lead sleeve united to the cable sheaths at opposite sides of the cable joint by a soldered or lead-wiped joint. A similar construction is employed with aluminum sheathed cable, using an aluminum sleeve and taking special precautions in welding, or soldering and wiping the joints between this sleeve and the cable sheaths of the respective cable lengths to be joined. However, both the soldering and the welding processes are complicated, particularly in the case of joining aluminum and aluminum. In the latter case, the existence of a film or oxide on the aluminum surfaces necessitates the use of equipment and procedures which add greatly to the cost of making such joints under the difficult conditions found in manholes or on aerial equipment.

The present invention has for its principal object the provision of a cable joint casing which overcomes the disadvantages noted above. While the new protective casing is applicable generally to a cable of the type described irrespective of the metal used for the external sheath, it may be used to particular advantage where the sheath of the cable lengths to be joined is made of aluminum.

A cable joint casing made according to the invention comprises a pair of sleeves adapted to be interconnected at adjacent ends to form a composite sleeve surrounding the joint between the two cable lengths. Adjacent each end of this composite sleeve is a split clamp, each clamp having separable arcuate sections and releasable means, such as bolts, for drawing the sections together around the sheath of a corresponding cable length, whereby the sections of each clamp grip the sheath tightly. The composite sleeve has opposite end portions releasably engaging the respective clamps to form a substantially closed space around the cable point. Connecting means are provided for releasably interconnecting the adjacent ends of the two sleeves to hold the opposite end portions of the composite sleeve in engagement with the respective clamps. With this construction, the two sleeves may be slid over the ends of the respective cable lengths to be joined, and after the joint has been made, one of the split clamps is applied to the corresponding cable sheath near the joint, and the corresponding sleeve is releasably engaged with this clamp; whereupon the other split clamp is applied in proper position to the sheath of the other cable length, and the corresponding sleeve is releasably engaged with the latter clamp. By means of the releasable connecting means, the adjacent ends of the two sleeves are then interconnected to hold the opposite end portions of the composite sleeve in engagement with the respective clamps, thereby forming a substantially closed space around the joint.

In the preferred construction, an annular end member, which may be split, is adapted to surround and slide on each cable sheath and is releasably secured to the corresponding split clamp, either directly or through the adjacent end portion of the composite sleeve.

In one embodiment of the invention, one of the arcuate sections of each split clamp has an annular part adapted to surround and slide on the corresponding sheath and which engages the adjacent end portion of the composite sleeve, one of these end portions being releasably connected to the annular end part of the adjacent clamp; and each annular end member of the casing is screwed on or otherwise releasably connected to the annular end part of the corresponding split clamp. In another embodiment of the invention, each end portion of the composite sleeve is screwed on or otherwise releaseably connected to the adjacent split clamp, and the adjacent end cap, in turn, is screwed on the corresponding end portion of the composite sleeve.

For a better understanding of the invention, reference may be had to the accompanying drawing, in which Fig. 1 is a longitudinal sectional view of one form of the new casing applied to a cable joint, and Fig. 2 is a view similar to Fig. 1 but illustrating another embodiment of the invention.

Referring to Fig. 1, the reference numerals 1 and 2 designate, respectively, the external metallic sheaths of the two cable lengths to be joined, these sheaths being made of aluminum. The cable parts which these sheaths contain (including the usual electrical conductor or conductors and the surrounding insulation) are shown generally at 1a and 2a, respectively; and the insulated electrical joint between the two cable lengths is shown generally at 3.

The protective casing for the joint, as shown in Fig. 1, comprises a conical annular aluminum member 4, having O-rings 5 and 5a, which forms an end member surrounding the sheath of cable 1. A pair of aluminum sleeves 6a and 6b are interconnected at adjacent ends to form a composite sleeve surrounding the cable joint 3 and the end portions of the outer sheaths of the respective cables 1 and 2. The opposite end portions of this composite sleeve are formed by aluminum rings 6c and 6d which are factory-welded to the outer ends of the sleeves 6a and 6b, respectively. Thus, the rings 6c and 6d form annular flanges which extend radially inward from the composite sleeve toward the respective cable lengths. An O-ring 5c engages the inner face of the end portion 6c of the composite sleeve 6a—6b.

A split clamp 7—8 is secured around the outer sheath of the cable length 1 near the joint 3. This clamp includes separable arcuate sections 7 and 8 having internal gripping surfaces 7a and 8a, respectively, which may be formed by threads cut in these surfaces. The arcuate clamp section 8 is integral with an annular end part 9 which surrounds and is slidable on the sheath of cable 1. The annular end part 9 has an outer extension of reduced diameter which is externally threaded at 9a, so that the end member 4 may be screwed on this part. In its interior surface, the annular end part 9 is recessed to receive an O-ring 10 closely surrounding the outer sheath of cable 1. The annular end part 9 is also provided with threaded holes for machine screws 11, forming releasable means for connecting the sleeve end portion 6c to the part 9. Thus, the sleeve end portion 6c is clamped between the end member 4 and the annular part 9, with the O-rings 5 and 5c engaging opposite sides of the end portion 6c, and with the O-ring 5a interposed between the end member 4 and the opposed end of the annular end part 9.

As previously mentioned, the arcuate clamp section 7 is separable from the co-acting section 8 of the clamp. On opposite sides, the outer surface of the clamp section 7 is provided with recesses 7b for receiving the heads of machine screws 12 which are screwed into the wall of the mating clamp section 8. The screws 12 thus form releasable means for drawing the clamp sections 7 and 8 together around the cable sheath, so that the threads or gripping surfaces 7a—8a grip the sheath tightly. The assembled clamp sections 7—8 are surrounded by spare O-rings 13.

The outer sheath of cable length 2 is surrounded by an annular end member 15 similar to the member 4 and adapted to slide on this sheath, the member 15 being provided with an O-ring 16 closely surrounding the sheath. This sheath is gripped by a split clamp similar to that previously described, the parts 17, 18 and 19 corresponding to the parts 7, 8 and 9. The separable clamp sections 17 and 18 are held together by releasable means in the form of screws 22, so that the gripping surfaces 17a and 18a effect a tight grip on the cable sheath. The annular end part 19 is provided with O-rings 20 engaging the inner surface of the end portion 6d of the composite sleeve, which is clamped between the part 19 and the annular end member 15 screwed on the threaded portion 19a. The internal surface of the end part 19 is recessed to receive an O-ring 21 closely surrounding the outer sheath of cable 2. The clamp sections 17—18 may be surrounded by spare O-rings (not shown) similar to the rings 13.

The adjacent ends of the sleeves 6a and 6b are provided with external flanges 6e and 6f, respectively, which are interconnected by bolts 24 and nuts 25. Thus, the parts 24—25 form releasable means for interconnecting the adjacent ends of the sleeves to hold the opposite end portions 6c and 6d of the composite sleeve in engagement with the annular end parts of the corresponding split clamps 7—8 and 17—18. An O-ring 23 is interposed between the connecting flanges 6e and 6f of the two sleeves.

The protective casing as illustrated is adapted for large gas-pressure cable, the composite sleeve 6a—6b being provided with a fitting 27 by which the usual gas may be introduced through a supply tube (not shown). The cable lengths 1 and 2 include the usual gas tubes 28 and 29, respectively, extending within the cable sheaths; and these tubes are connected to the fitting 27, which serves to supply gas to these tubes and to the closed space provided by the casing and which surrounds the cable joint 3.

In the use of the cable joint casing illustrated in Fig. 1, the parts 4, 6a and 9 and their associated O-rings are slid over the cable length 1 from the unjointed end thereof; and the parts 15, 6b and 19 and their associated O-rings are slid over the other cable length 2 from the unjointed end thereof. With the sleeves 6a and 6b separated from each other, the electrical part of the cable joint can be made, as shown at 3, and the ends of the gas tubes 28 and 29 can be connected to the fitting 27. The protective casing can then be assembled, as will now be described.

Beginning with the end of cable sheath 1, the clamp part 8—9 is located in position near the end of this sheath and the detached half cylinder or arcuate section 7 is placed over and bolted to the lower half 8 by means of the bolts 12. The spare O-rings 13 are then placed in position. The end portion 6c of sleeve 6a is then brought up against the annular part 9 and secured to the latter by the bolts or screws 11. The end member 4 is then screwed on the threaded extension 9a; the member 4 being provided with suitable wrench holes for this purpose.

Turning now to the other end of the joint, the spare O-rings (not shown) are inserted, and the clamp part 18—19 is positioned near the end of sheath 2, where it will be engaged by the sleeve end portion 6d when the two sleeves are interconnected. The upper half cylinder 17 of the clamp is then secured to the lower section 18 by the screws 22, with the O-rings placed in position. The two sleeves 6a and 6b are then connected together by the bolts and nuts 24—25, and the end member 15 is screwed on the threaded extension 19a of the annular part 19.

The interior surfaces of the end members 4 and 15 are made smooth so that these members can be easily slid and rotated on the respective cable sheaths.

The embodiment illustrated in Fig. 2 is especially adapted for small cables. It comprises end members 4 and 15 as in Fig. 1, which are slidable on the respective cable sheaths 1 and 2. The two sleeves are shown at 30a and 30b and are provided at adjacent ends with external flanges 30c and 30d, respectively. These sleeves are connected at their opposite ends to annular members 31 and 32, respectively, as by factory welding. Thus, the annular members 31 and 32 form the opposite end portions of the composite sleeve resulting from interconnection of the sleeves 30a and 30b at their adjacent ends. The annular member 31 has an extension which is externally threaded at 31a, so that the end member 4 can be screwed on the member 31. Also, the member 31 has an annular recess in its internal surface for receiving an O-ring 33 which closely surrounds the cable sheath.

A split clamp 34—35 is located adjacent the end of cable sheath 1. The clamp sections 34—35 are each arcuate or in the form of a half-cylinder and are provided with internal gripping surfaces 34a and 35a, respectively, which may be formed by threading these surfaces. At opposite sides, the external surface of the upper clamp section 34 is provided with recesses 4c for receiving the heads of screws 36, which are screwed into the opposed underlying surfaces of the lower clamp section 35. The external cylindrical surface of the split clamp 34—35 is threaded at 34b and 35b, so that it mates with the threaded internal surface of the annular member 31.

The annular member 32 is similarly screwed on a split clamp 37—38, the arcuate sections of which are drawn together around cable sheath 2 by screws 39, it being understood that the split clamp 37—38—39 is similar to the split clamp 34—35—36 at the opposite end of the joint 3. The outer end of clamp 37—38 is engaged by a recessed aluminum back-up ring 40 which, in turn, is engaged by an O-ring 41, both of these rings surrounding the sheath 2.

In the use of the casing shown in Fig. 2, the parts 4, 31—30a and the associated O-rings are slipped over the unjointed end of cable 1, and the parts 15, 32—30b and the associated O-rings are slipped over the unjointed end of cable 2, after which the joint 3 is made while the externally flanged ends of the sleeves are separated. Then the split clamp 37—38 is clamped by its screws 39 around the sheath 2 near its end, and the back-up ring 40 and gasket 41 are brought up against the outer end of this clamp. The sleeve 30b with its attached ring 32 is then screwed on the externally threaded clamp 37—38, and the O-ring 16 is placed in position and the end member 15 screwed against it, this end member being screwed on the externally threaded extension 32a of the annular member 32.

The split clamp 34—35 is then secured in position on the sheath 1 by the clamping screws 36, after which the annular member 31 and its attached sleeve 30a are screwed on the externally threaded surface of this clamp, the O-ring 33 being held in the member 31. The flanged ends of the sleeves 6a and 6b are then interconnected by bolts 42 and nuts 43. The O-ring 5 is then positioned against the outer end of member 31, and the joint is completed by screwing the end member 4 on the threaded extension 31a.

We claim:
1. A casing for the joint between two lengths of electric cables each having an outer protective metal sheath, said casing comprising a pair of sleeves adapted to be interconnected at adjacent ends to form a composite sleeve surrounding said joint, a split clamp located within the composite sleeve adjacent each end of the composite sleeve and movable bodily toward said adjacent ends of the sleeve, each clamp having separable arcuate sections and releasable means for drawing the sections together around the sheath of a corresponding cable length, whereby said sections grip the sheath tightly, means releasably securing the composite sleeve at the opposite end portions thereof to the respective clamps to form a substantially closed space around said joint, and connecting means releasably interconnecting said adjacent ends of the sleeves to form said composite sleeve, said releasable securing means including an annular end member adapted to surround and slide on each cable sheath and releasably secured to the corresponding split clamp.

2. A casing according to claim 1, in which said annular end member is releasably secured to the corresponding split clamp through the adjacent end portion of the composite sleeve.

3. A casing for the joint between two lengths of electric cables each having an outer protective metal sheath, said casing comprising a pair of sleeves adapted to be interconnected at adjacent ends to form a composite sleeve surrounding said joint, a split clamp located within the composite sleeve adjacent each end of the composite sleeve and movable bodily toward said adjacent ends of the sleeve, each clamp having separable arcuate sections and releasable means for drawing the sections together around the sheath of a corresponding cable length, whereby said sections grip the sheath tightly, means releasably securing the composite sleeve at the opposite end portions thereof to the respective clamps to form a substantially closed space around said joint, and connecting means releasably interconnecting said adjacent ends of the sleeves to form said composite sleeve, one of said arcuate sections of each clamp having an annular end part adapted to surround and slide on the corresponding cable sheath and engaging the adjacent end portion of the composite sleeve.

4. A casing according to claim 3, which comprises also releasable means connecting one of said end portions to said annular end part of the adjacent clamp.

5. A casing according to claim 3, in which said releasable securing means include an annular end member adapted to surround and slide on each cable sheath and screwed on said end part of the corresponding clamp.

6. A casing according to claim 3, in which said releasable securing means include an annular end member adapted to surround and slide on each cable sheath and screwed on said end part of the corresponding clamp, each end portion of the composite sleeve being clamped between said end part of the adjacent clamp and the corresponding annular end member.

7. A casing for the joint between two lengths of electric cables each having an outer protective metal sheath, said casing comprising a pair of sleeves adapted to be interconnected at adjacent ends to form a composite sleeve surrounding said joint, a split clamp located within the composite sleeve adjacent each end of the composite sleeve and movable bodily toward said adjacent ends of the sleeve, each clamp having separable arcuate sections and releasable means for drawing the sections together around the sheath of a corresponding cable length, whereby said sections grip the sheath tightly, means releasably securing the composite sleeve at the opposite end portions thereof to the respective clamps to form a substantially closed space around said joint, and connecting means releasably interconnecting said adjacent ends of the sleeves to form said composite sleeve, said releasable securing means including mating threads on each end portion of the composite sleeve and the adjacent split clamp.

8. A casing according to claim 7, which comprises also an annular end member adapted to surround and slide on each cable sheath and screwed on the adjacent end portion of the composite sleeve.

References Cited in the file of this patent

UNITED STATES PATENTS

| 2,139,125 | Hixon | Dec. 6, 1938 |
| 2,788,385 | Doering et al. | Apr. 9, 1957 |

FOREIGN PATENTS

| 168,224 | Austria | May 10, 1951 |